A. C. WILCOX.
GLASS BLOWING APPARATUS.
APPLICATION FILED JAN. 25, 1912.
1,029,779.
Patented June 18, 1912.
7 SHEETS—SHEET 2.
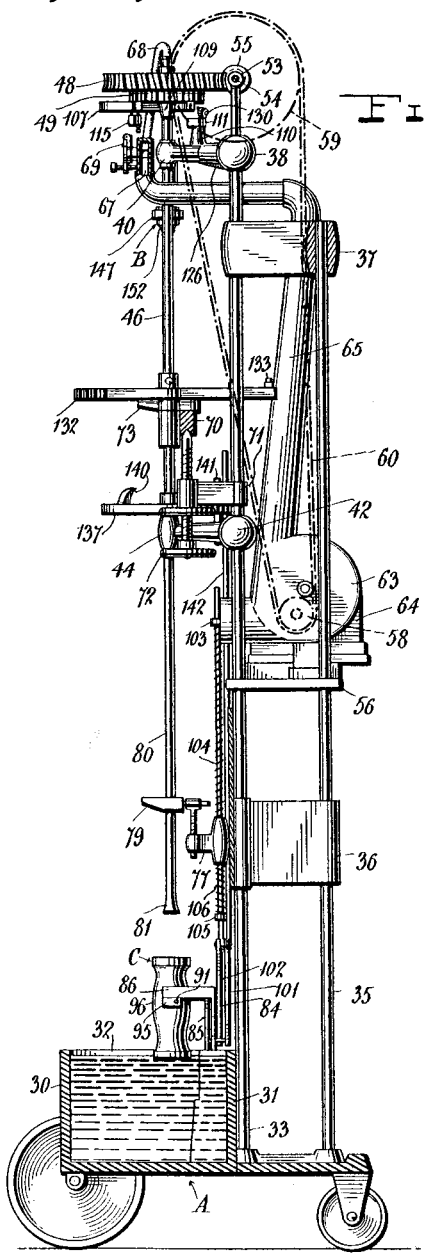
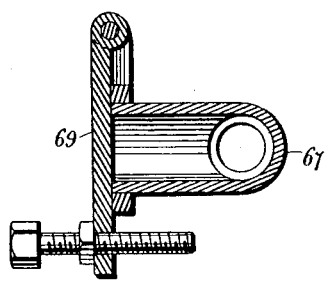
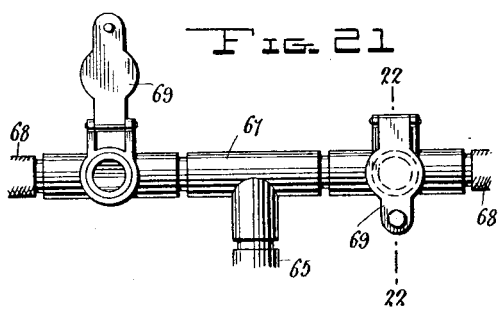
Witnesses
Inventor
A. C. Wilcox,
By 
Attorneys.

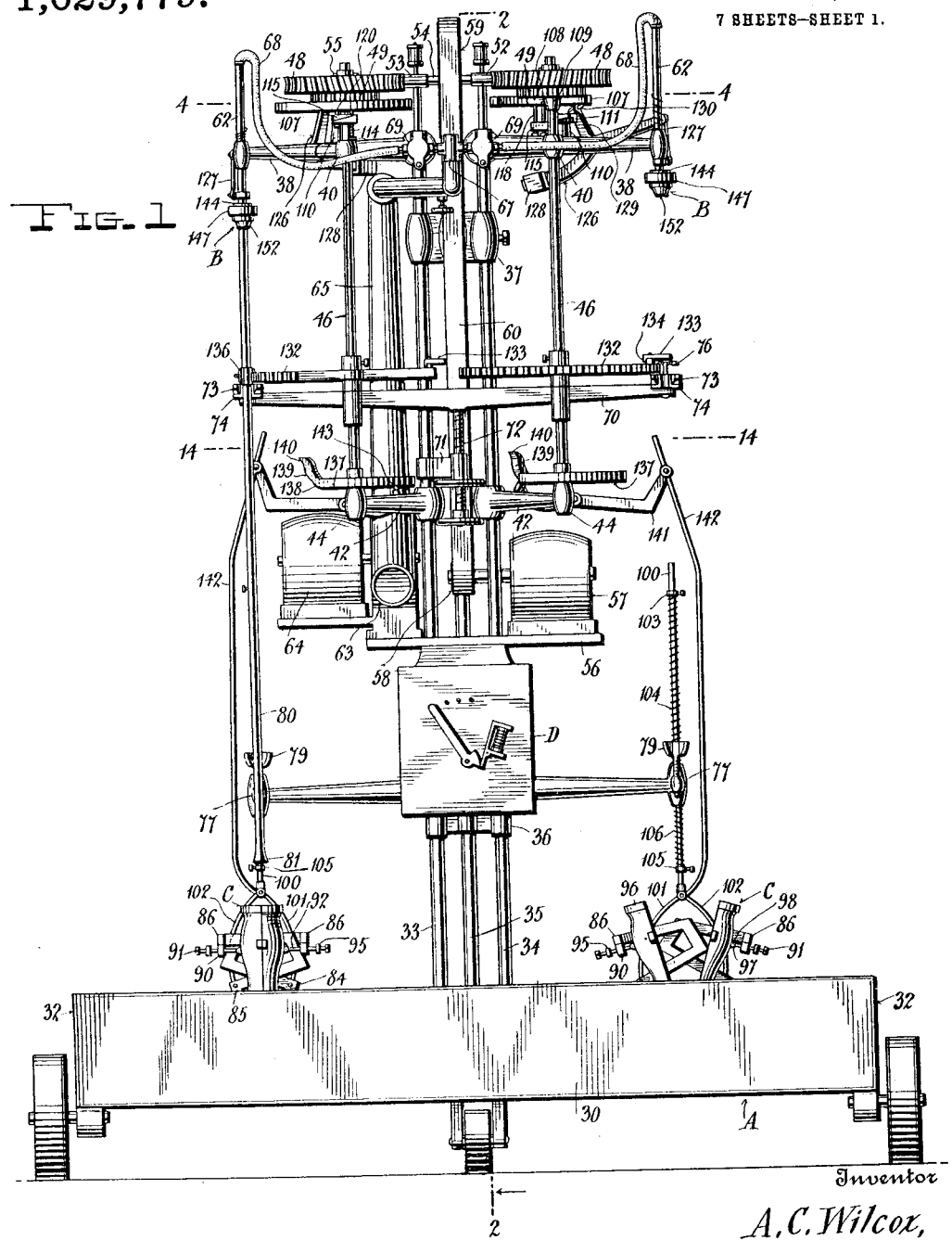

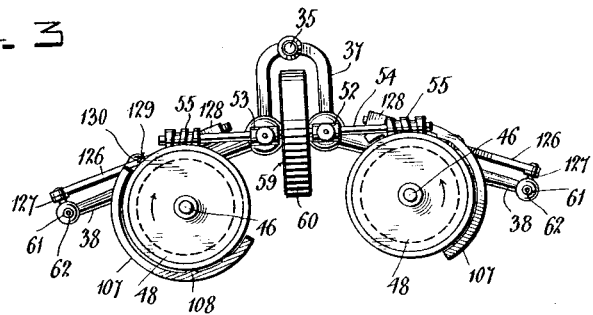
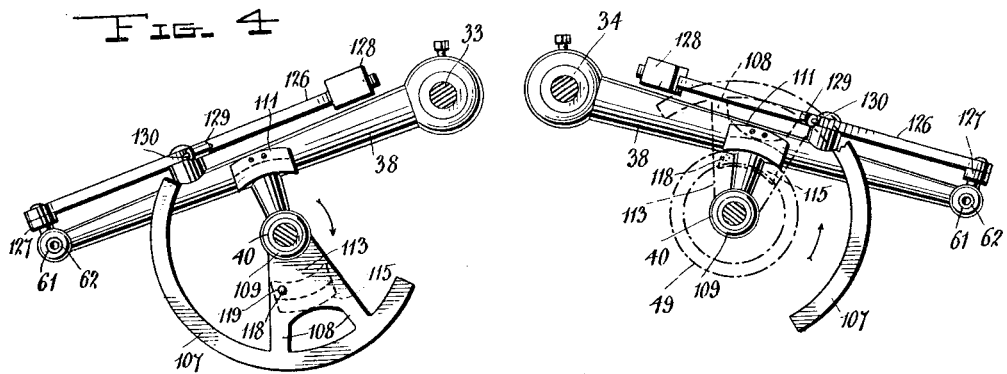
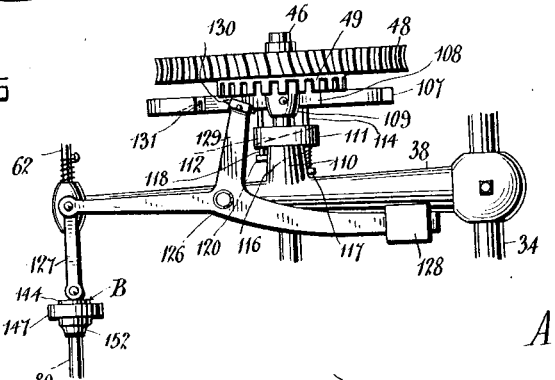

A. C. WILCOX.
GLASS BLOWING APPARATUS.
APPLICATION FILED JAN. 25, 1912.

1,029,779.

Patented June 18, 1912.
7 SHEETS—SHEET 4.

Witnesses

Inventor
A. C. Wilcox,
By
Attorneys

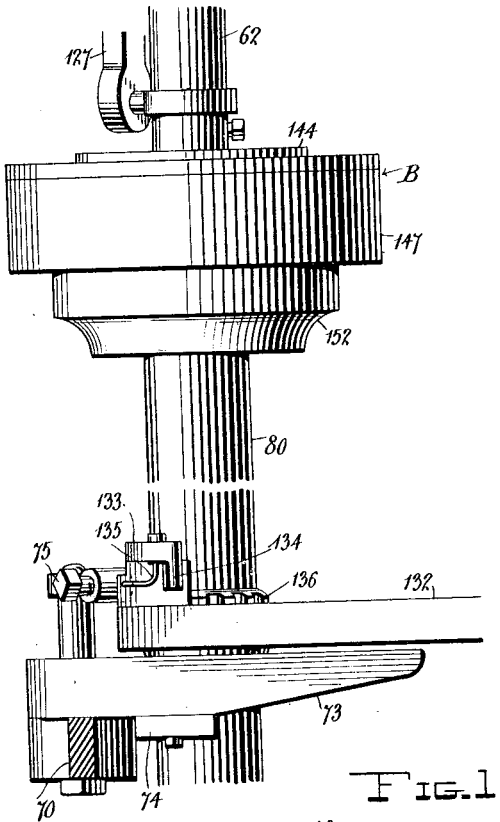
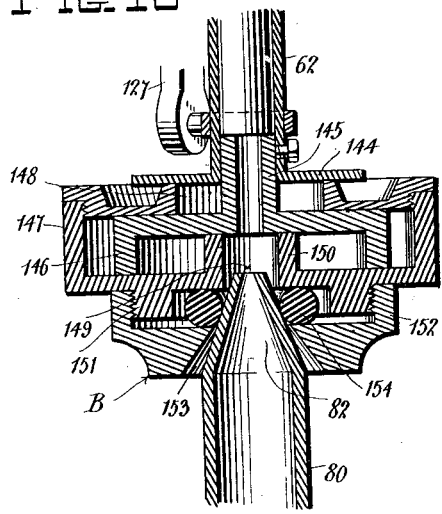
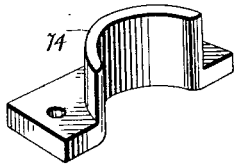
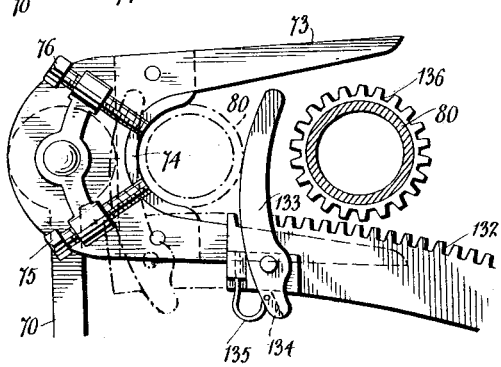

A. C. WILCOX.
GLASS BLOWING APPARATUS.
APPLICATION FILED JAN. 25, 1912.

1,029,779.

Patented June 18, 1912.
7 SHEETS—SHEET 6.

Inventor
A. C. Wilcox,

Witnesses
Attorneys

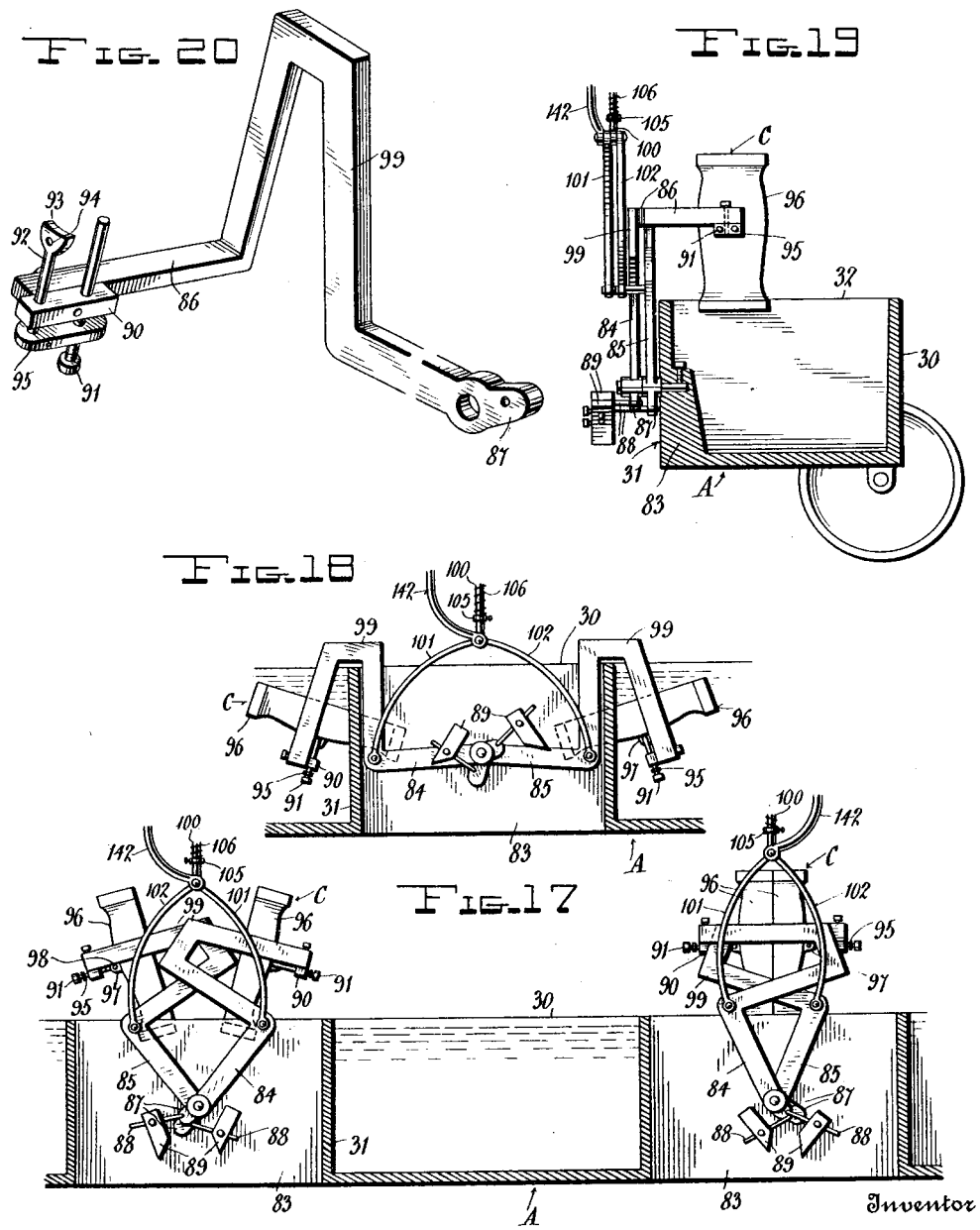

UNITED STATES PATENT OFFICE.

ALBERT C. WILCOX, OF WHEELING, WEST VIRGINIA.

GLASS-BLOWING APPARATUS.

1,029,779.  Specification of Letters Patent.  Patented June 18, 1912.

Application filed January 25, 1912. Serial No. 673,418.

*To all whom it may concern:*

Be it known that I, ALBERT C. WILCOX, a citizen of the United States, residing at Wheeling, in the county of Ohio, State of West Virginia, have invented certain new and useful Improvements in Glass-Blowing Apparatus; and I do hereby declare the following to be a full, clear, and exact description of the invention, such as will enable others skilled in the art to which it appertains to make and use the same.

This invention relates to glass blowing apparatus.

The object of the invention resides in the provision of a glass blowing apparatus which is capable of an exceedingly large output of product and which will require a relatively small amount of attention during its operation with resultant economy and correspondingly large profits incident to its use.

A further object of the invention resides in the provision of a glass blowing apparatus which will produce uniformly perfect ware and which embodies various improved forms of construction as will hereinafter appear.

With the above and other objects in view, the invention consists in the details of construction and in the arrangement and combination of parts to be hereinafter more fully described and particularly pointed out in the appended claims.

In describing the invention in detail, reference will be had to the accompanying drawings wherein like characters of reference denote corresponding parts in the several views, and in which—

Figure 6:
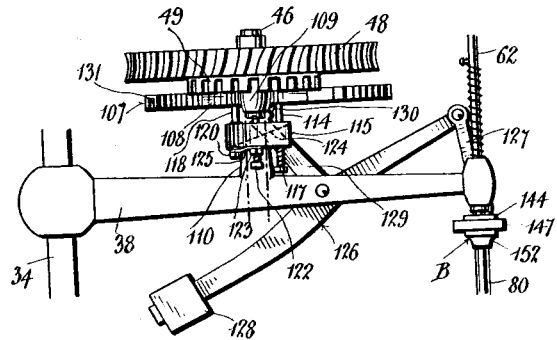
Figure 7:
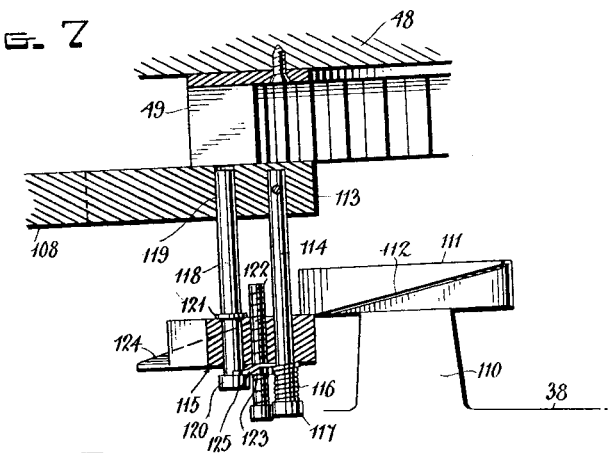
Figure 8:
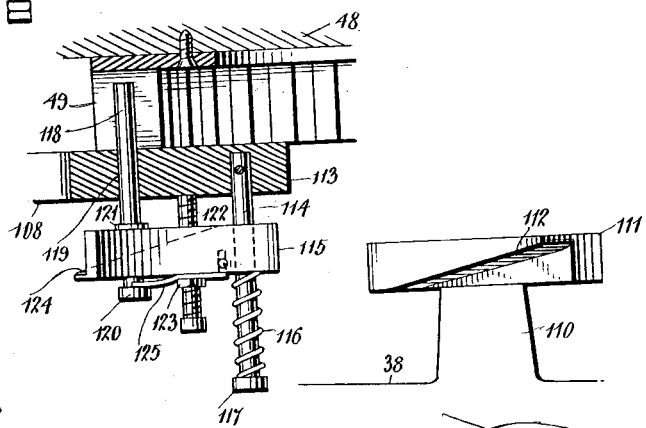
Figure 14:
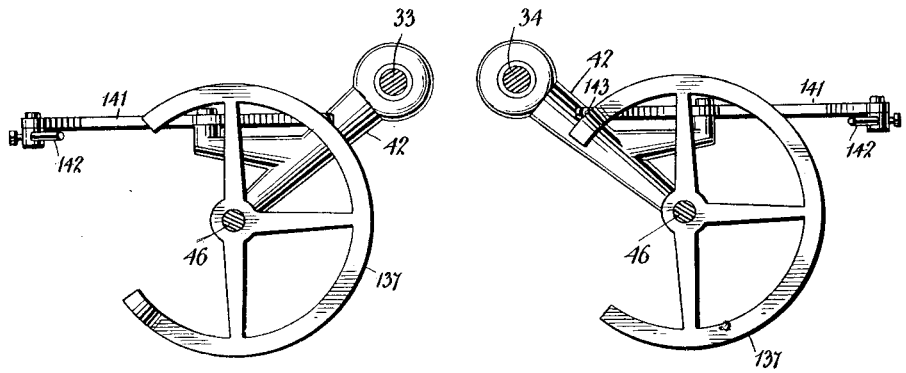
Figure 15:
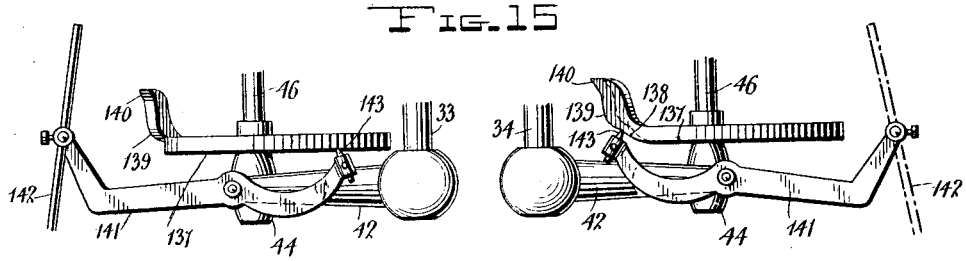
Figure 16:
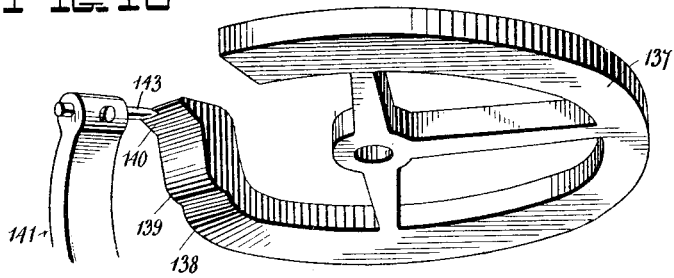

Figure 1 is a front elevation of a dual head glass blowing apparatus constructed in accordance with the invention. Fig. 2, a section on the line 2—2 of Fig. 1, Fig. 3, a partial plan view of what is shown in Fig. 1, Fig. 4, an enlarged section on the line 4—4 of Fig. 1 with certain lower parts of the machine omitted. Fig. 5, a detail view in elevation of the trip mechanism of one of the heads of the machine which controls the slip joint between the air supply and blow pipe, said trip mechanism being shown in released position and the slip joint controlled thereby in position to effect an operative connection between the blow pipe and the air supply. Fig. 6, another detail view partly in elevation and partly in section of the slip joint trip mechanism of one of the heads of the machine showing the parts thereof in the position they would occupy when the slip joint is locked out of operative connection with the blow pipe and the clutch element of said trip mechanism thrown out, Fig. 7, a detail view partly in elevation and partly in section of the clutch of the slip joint trip mechanism showing the position of the elements of the clutch just previous to effecting the throwing in of the clutch by the application of a blow pipe to the machine, Fig. 8, a view similar to Fig. 7 showing the clutch completely thrown in, Fig. 9, an enlarged detail view in elevation showing the upper element of one of the blow pipe holders of the machine, with a blow pipe therein and the slip joint between the blow pipe and the air supply in operative connection with said blow pipe, Fig. 10, a vertical section through the slip joint and the upper end of the blow pipe illustrated in Fig. 9, Fig. 11, a plan view of the blow pipe holder element illustrated in Fig. 9, together with certain contiguous parts of the machine and with the blow pipe shown in full lines in the position it would occupy just previous to its insertion in the element of the holder and in dotted lines in the position it would occupy after complete insertion in said element, and also showing the contiguous parts of the machine in full lines before the application of the blow pipe and in dotted lines after the application of the blow pipe. Fig. 12, a detail perspective view of the bearing carried by the blow pipe holder element shown in Figs. 9 and 11 and upon which the blow pipe is adapted to rotate during the blowing operation. Fig. 13, a detail perspective view of the stop arm carried by a certain element of the machine in each head of the latter and positioned to be engaged by the blow pipe in its application to the holder, whereby the movement of the blow pipe in such application is transmitted to effect the throwing in of the clutch of the slip joint trip mechanism and also to effect one complete cycle of operation of a given head of the machine. Fig. 14, a section on the line 14—14 of Fig. 1 with certain portions of the machine omitted to more clearly disclose the tripping mechanisms of both heads of the machine which control the predetermined operation of the molds of the heads respectively to open and closed position during each cycle of operation, Fig. 15, is a rear elevation of what is shown in Fig. 14, Fig. 16, a detail perspective view of the cam and one end of the tripping lever of the mold operating trip mechanism of one head and showing the relation between the cam and the tripping lever after the latter has been released from engagement with the cam to allow the mold sections to move to completely open position and into the cooling tank, and just at the beginning of the operation of said tripping lever by the cam to effect the movement of the mold sections to partially closed position before the cycle of operation of the head of the machine is completed. Fig. 17, is a rear elevation of the cooling tank of the machine showing the pivotal mounting of the mold sections supporting arms, one of the molds being shown completely closed and the other partially closed, Fig. 18, a view in elevation of one of the molds showing the sections thereof in full open position, Fig. 19, a side elevation of the cooling tank of the machine partly in section and showing the manner of mounting a mold thereon, the sections of the latter being shown in full closed position. Fig. 20, a detail perspective view of one of the mold section carrying arms, Fig. 21, a detail view in elevation of a portion of the connections between the air supply and the slip joints of the machine, and Fig. 22, a section on the line 22—22 of Fig. 21.

Referring to the drawings, the apparatus is shown as comprising a wheeled base A, the forward portion of which is enlarged laterally and provided with vertical front and rear extensions 30 and 31 respectively and vertical side extensions 32 connecting said front and rear extensions at respective ends and forming in conjunction with the base and said front and rear extensions a suitable cooling tank. Rising from the base A are uprights 33, 34 and 35 disposed in spaced relation to each other and mutually connected together near their lower ends by a cross head 36, while another cross head 37, adjustable on said uprights mutually connects same together at their upper ends. Fixed to and radiating from the uprights 33 and 34 adjacent their upper ends are arms 38 respectively and these arms carry respectively journal bearings 40. Fixed to and radiating from respective uprights 33 and 34 below the arms 38 are arms 42 which carry respectively journal bearings 44 disposed in vertical alinement respectively with the journal bearings 40. Rotatably mounted in alined bearings 40 and 44 are shafts 46. Loosely mounted upon each shaft 46 above the arms 38 is a worm wheel 48 which has mounted upon its lower face a crown gear 49. Mounted upon the upper end of the upright 34 is a journal bearing 52, while a corresponding journal bearing 53 is mounted on the upper end of the upright 33 and journaled in these bearings 52 and 53 is a shaft 54 disposed at right angles to the shafts 46 and has mounted on its end portions worms 55 in mesh respectively with the worm wheels 48. Mounted upon a bracket stand 56 supported from the uprights 33, 34 and 35 is a motor 57, the shaft of which is provided with a belt wheel 58 in alinement with a belt wheel 59 fixed upon the shaft 54 between the journal bearings 52 and 53. Traveling on the belt wheels 58 and 59 is a belt 60 through the agency of which the rotation of the shaft of the motor 57 is imparted to the shaft 54, and through this last named shaft the continuous rotation of the worm wheels 48 is effected, as will be apparent.

The outer ends of each of the arms 38 are enlarged and provided with vertical openings 61 in each of which is slidably mounted a pipe 62 which carries at its lower end a slip joint B. Mounted upon the bracket stand 56 at the opposite end thereof from the motor 57 is a fan 63 operated by suitable connections with a motor 64, which latter is also supported by the bracket stand 56. The blast of air produced by the fan operated by the motor 64 is conveyed by a pipe 65 to a distributing T-joint 67, which latter is connected by flexible pipe sections 68 to the upper ends of each of the pipes 62. Mounted in each of the arms of the T-joint 67 is an air pressure regulating valve 69 through the medium of which the pressure of the air blast is regulated so as to avoid defects in the ware produced by the machine.

Slidably mounted upon the shafts 46 above the arms 42 and below the arms 38 is a cross member 70 the ends of which are disposed in vertical alinement with the ends of the arms 38 respectively. Fixed to the upright 33 and projecting radially therefrom just above the arm 42 is an arm 71 the end of which is disposed directly below the central portion of the cross member 70 and has threaded vertically therethrough an adjusting screw 72, the upper end of which latter engages and supports the cross member 70 in different adjustments to the arms 38. From this construction it will be apparent that as the adjusting screw 72 is rotated in one direction the cross member 70 will be elevated, while the reverse rotation of said screw will allow said cross member to descend under the influence of gravity. Mounted on each end of the cross member 70 is a horizontally disposed U-shaped member 73, the mouth of which is directed toward the cooling tank formed on the base of the machine. Secured to each member 73 is a bearing 74 disposed against the inner face of its bight portion. Mounted above and on each of the members 73 at each side of the latter are adjusting screws 75 and 76, said screws being directed inwardly from opposite sides of the member and movable across the top of the bearing 74 so as to limit the movement of the blow pipe inwardly between the arms of the member 73 as will hereinafter appear. Fixed upon the uprights 33 and 34 beneath the bracket stand 56 and radiating from said uprights respectively are arms 77 which support at their outer ends respectively U-shaped members 79 disposed correspondingly to and in vertical alinement with respective U-shaped members 73 carried upon the ends of the cross member 70, the vertically alined U-shaped members 73 and 79 constituting a holder for a blow pipe 80. This blow pipe has its lower end provided with the usual flared bait 81, while the upper end thereof is tapered as at 82 to afford means for ready connection between the upper end of the blow pipe and the slip joint B as will hereinafter appear.

The vertical extension 31 of the base A is provided on opposite sides of its center with inwardly directed portions 83 respectively disposed directly beneath the outer ends of respective arms 77. Mounted on a common pivot against the outer face of the vertical extension 31 between the limits of each inwardly directed portion 83 are arms 84 and 85 one end of each of which is provided with an angular extension 86 directed across the extension 31 and over the cooling tank while the other end of each arm 84 and 85 is provided with an extension 87 carrying an angular stud 88 upon which is mounted a balancing weight 89. Fixed on the lower edge of the angular extension 86 of each arm 84 and 85 is a block 90 in which is rotatably mounted, but incapable of longitudinal movement, an adjusting screw 91, the threads of which are disposed between the head of the screw and the block 90. Slidably mounted in the outer end of each block 90 is a stem 92, the inner end of which is enlarged as at 93 and provided with an opening 94. The outer end of the stem 92 is fixed to a plate 95 disposed at right angles to said stem and also threaded upon the screw 91 between the head of said screw and the block 90. The molds employed in the machine are indicated at C and each is shown as comprising corresponding mating sections 96 two in number. Each of these mold sections 96 has formed on its outer face spaced ears 97 which receive therebetween the enlarged portion 93 of respective stems 92 and are secured to respective stems by the passage of a locking pin 98 through the ears 97 and through the opening 94. By this construction it will be apparent that the mold sections 96 may be brought into and out of mating relation by the movement of the arms 84 and 85 on their common pivot, such movement being automatically imparted to the arms during the operation of the machine as will hereinafter appear. It will be further apparent that by the manipulation of the screw 91 the plate 95 and stem 92 may be adjusted so as to move the mold section toward and away from the angular extension 86 by which said section is supported and by this means a coöperating pair of mold sections may be properly adjusted so as to assure their coming together in proper mating relation. The arms 84 and 85 are each provided between their pivot and the angular extension 86 with a V-shaped portion 99 which is adapted to receive a respective side wall of an inwardly directed portion 83 of the cooling tank so as to allow the arms 84 and 85 to swing the mold sections 86 away from each other the desired distance to effect the complete immersion of said mold sections in the fluid carried by the cooling tank. During the operation of the mold sections toward and away from each other the weight of each section is balanced by the weight 89 mounted on the opposite end of its supporting arm so that very little force is required to operate the arms 84 and 85 to move the mold sections toward and away from each other. Slidably mounted in the outer end of each of the arms 77 is a vertical rod 100 and pivotally connected to the lower end of each these rods 100 are arms 101 and 102 and these arms are in turn pivotally connected at their lower ends to the arms 84 and 85 at a corresponding intermediate point in the latter respectively. Mounted upon each of the rods 100 above respective arm 77 is an adjustable collar 103. Encircling each of the rods 100 between the adjustable collar 103 and respective arms 77 is a coil spring 104. Mounted upon each of the rods 100 beneath the arms 77 is an adjustable collar 105 and encircling these rods 100 between the adjustable collar 105 and respective arms 77 is a coil spring 106. By this construction it will be apparent that the reciprocation of respective rods 100 will effect the movement of the sections of respective molds to open and closed position and that the springs 104 and 105 will serve to cushion the mold sections at the termination of their movements.

The structure by which the operation of a given head of the machine is instituted upon the application of the blow pipe 80 to the blow pipe holder of such head will now be described. Fixed upon each of the shafts 46 between respective arms 38 and worm wheels 48 is a curved track 107, such track being supported substantially concentric to respective shafts 48 by means of arms 108 radiating from suitable hubs 109 fixed on said shafts 46 respectively. Rising from the upper face of each of the arms 38 is a stud 110 which carries at its upper end a block 111 provided with a beveled face 112. The arms 108 radiating from respective hubs 109 are mutually connected at their inner ends by a web 113 forming a continuous portion extending from the outer side of one arm 108 to the outer side of the other arm 108. Depending from the lower face of the continuous portion formed by the web 113 is a pin 114 upon which is slidably mounted a block 115. This block is normally held in position close to the web 113 by means of a spring 116 which encircles the pin 114 and bears at one end against a head 117 formed on the pin 114 and at its other end against the block 115.

A pin 118 is slidably mounted in the block 115 and projects through an opening 119 in one of the arms 108. This pin 118 is provided on its lower end with a head 120 and also provided intermediately with a flange 121 disposed above the block 115, said head 120 and flange 121 limiting the sliding movement of the pin 119 in the block 115. Threaded in the block 115 between the pins 114 and 118 is an adjusting screw 122 provided beneath the block 115 with a locking nut 123 whereby said screw may be locked in a desired adjusted position. The upper end of this adjusting screw 122 is adapted to engage the web 113 and thereby limit the upward movement of the block 115 under the influence of the spring 116. The block 115 is provided on its inner side with a beveled face 124 and said block is so positioned that when same rotates with the adjacent shaft 46, in the direction indicated by the arrow in Fig. 8, the beveled faces 112 and 124 of respective blocks 111 and 115 will coöperate with each other to force the block 115 and the pin 118 carried thereby downwardly. The pin 118 carried by the block 115 is disposed in position to engage the adjacent crown gear 49 when the block 115 is at the limit of its upward movement. By this construction it will be apparent that the coöperating blocks 111 and 115 and the parts carried by the latter together with the crown gear 49 of a given head of the machine constitute a clutch whereby the shaft 46 of said head is locked to the worm wheel 48 so as to effect the rotation of said shaft by the rotation of said worm wheel 48. It will be noted that so long as the block 115 is in engagement with the block 111 the pin 118 will be disposed out of engagement with the adjacent crown gear and the shaft 46 of the same head of the machine will remain inactive. However, as soon as the block 115 has passed out of engagement with the block 111 it will be moved upwardly under the influence of the spring 116 and as a result the pin 118 will move into engagement with the crown gear of the same head of the machine and in this manner the shaft 46 of said head will be locked to the worm wheel 48 loosely mounted thereon and partake of the rotation of said worm wheel. When the shaft 46 of one head of the machine has almost completed one revolution under the influence of engagement between the crown gear 49 and pin 118 the block 115 will engage the block 111, and continued rotation of said shaft will effect a coöperation of the beveled faces 112 and 124 to draw the block 115 downwardly and release the pin 118 from engagement with the crown gear and thus automatically throw the shaft 46 out of operative connection with the worm wheel 48 which is loosely mounted on said shaft. In order to produce a yielding pull on the pin 118 during the downward movement of the block 115 a leaf spring 125 is mounted on the lower face of said block in engagement with the head 120 of said pin. Pivoted on each of the arms 38 is a two arm lever 126 one end of which is connected by a link 127 with the adjacent pipe 62, while the other end thereof carries a balancing weight 128. This lever 126 is provided intermediately with a laterally and upwardly directed arm 129 which carries on its outer end an engaging pin 130 adapted to engage the lower face of the adjacent track 107 during the rotation of the latter. The weight of the pipe 62 and slip joint B is in excess of that of the weight 128 so that when the track 107 has passed out of engagement with the pin 130 the pipe 62 and slip joint B will move downwardly and draw with them the adjacent end of the lever 126 against the influence of the balancing weight 128. As long as the pin 130 is out of engagement with the track 107 the slip joint B will be disposed in its lowermost position. The end of the track 107 which first approaches the pin 130 during the movement of the track is provided with a curved face 131 and when said curved face engages the pin 130 it will move the arm 129 of the lever 126 inwardly and rock said lever on its pivot a sufficient distance to elevate the slip joint B to the limit of its upward movement. As soon as the track 107 has moved a sufficient distance to pass out of engagement with the pin 130 the slip joint B and pipe 62 will descend under the influence of gravity in the manner heretofore referred to.

As the rotation of the shaft 46 of a given head of the machine is automatically stopped by the coöperation of the blocks 111 and 115, when said shaft has made one complete revolution, it will be apparent that said shaft 46 must be partially rotated in order to move said blocks 111 and 115 out of engagement with each other and thus operatively connect the shaft 46 with the rotating worm wheel 48 loosely mounted thereon. This partial rotation of the shaft 46 to move the block 111 and 115 out of engagement with each other is accomplished by the application of the blow pipe 80 to its holder through the instrumentality of the following structure.

Fixed upon each shaft 46 is a segmental gear 132 which during its rotation is adpted to pass across a portion of the upper face of the adjacent U-shaped member 73. Pivotally mounted upon the upper side of each segmental gear 132 is an arm 133, one end of which projects outwardly of the segmental gear, while the other end thereof projects a short distance inwardly of the gear beyond the pivot of said arm and is provided with an enlarged portion 134 adapted to engage said gear to limit the rotation of said arm on its pivot in the direction of rotation of the segmental gear carrying same. The enlarged inner end of the arm 133 is normally held in engagement with the segmental gear 132 by means of a spring 135 one end of which engages the inner end of said arm, while the other end thereof is suitably anchored to the gear 132. The arm 133 is disposed near the advancing end of the segmental gear 102 and extends across the upper face of the U-shaped member 73 when the blocks 111 and 115 are in engagement with each other and the gear 132 therefore idle. Upon the application of the blow pipe 80 between the arms of the U-shaped member 73 the arm 133 will be engaged by the blow pipe and as such arm can not rotate on its pivot in the direction of movement of the blow pipe between the arms of the U-shaped member 73 it will result in the segmental gear 132 and the shaft 46 with which said gear is associated being partially rotated and this partial rotation of the shaft 46 will move the block 115 out of engagement with the block 111 and connect the shaft 46 with the worm wheel 48 of the same head of the machine to effect the rotation of said shaft through said worm wheel. The blow pipe 80 has fixed on its uper end a gear 136 which, when said blow pipe has moved against the bearing 74 operatively engages the segmental gear 132 so that the rotation of the latter will effect the rotation of the blow pipe during the operation of blowing.

During each rotation of the shaft 46 of a given head the mold sections 96 of the mold associated with such head are operated in the desired manner by means of the following structure. Fixed upon each shaft 46 just above the adjacent arm 42 is a curve track 137 disposed substantially concentric with the shaft 46. The advancing end of the lower side of each track 137 is provided with a plurality of successive upwardly directed faces 138, 139, and 140 for a purpose that will presently appear. Pivotally mounted upon each arm 42 is a two arm lever 141, the outer end of which is connected by a link 142 to the lower end of the rod 100 associated with the same head of the machine, while the other end carries a pin 143 and is positioned so that said pin will engage the lower side of the adjacent track 137 during the rotation of the latter under the influence of the shaft 46 to which it is attached. When unrestrained the mold sections 96 will move of their own weight to full open position and such movement of the sections will draw down the outer end of the lever 141 with which they are connected, and force up the inner end of said lever. As the track 137 is rotated however, the pin 143 will be engaged by the face 140 of said track and continued movement of the latter will force down the inner end of the lever 141 which will raise the outer end of said lever and institute the closing movement of the mold sections 96. Continued rotation of the track 137 will eventually bring the face 139 into engagement with the pin 143 and owing to the curvature of this face the inner end of the lever will be further depressed which will result in additional closing movement being imparted to the mold sections 96 as will be apparent. When the pin 143 reaches the inner end of the face 139 the block 115 shall have moved into engagement with the block 111 so that the rotation of the track 137 is stopped, and the mold sections disposed in partially closed position so as not to interfere with the application of a fresh blow pipe to the particular head of the machine.

The slip joint B is formed by providing the lower end of the pipe 62 with a lateral flange 144 and mounted in the lower end of the pipe 62 is a tubular member 145 having an enlarged lower portion 146, said enlarged lower portion 146 being disposed in spaced relation to the flange 144. Embracing the enlarged portion 146 is a cylindrical casing 147 having an opening 148 in its top wall and a smaller opening 149 in its bottom wall, said last named opening being surrounded by an inwardly directed flange 150 bearing against the inner transverse wall of the enlarged portion 146. The cylindrical casing 147 has an interior diameter considerably in excess of the exterior diameter of the enlarged portion 146 and has its top wall slidably disposed between the flange 144 and the transverse wall of the enlarged portion 146.

By this construction it will be apparent that the casing 147 can move transversely of the pipe 62 and the enlarged portion 146 of the tubular member 145 without in any way interfering with the passage of air through the tubular member 145. The lower wall of the casing 147 is provided with an exteriorly threaded angular flange 151 upon which is screwed a cap 152 having an inwardly tapering opening 153 for receiving the tapered upper end 82 of the blow pipe 80. Clamped between the cap 152 and the lower wall of the casing 147 is a rubber ring 154 which serves to produce an air tight connection between the upper end of the blow pipe 80 and the slip joint as will be apparent. By this construction it will be apparent that when the slip joint B and the blow pipe 80 are associated with each other either of them may move laterally within certain limits without in any manner interfering with the proper supply of air being fed to the blow pipe.

As both heads of the machine as heretofore described are identical in structure and operation only one of them will be referred to in describing the operation of the apparatus. Assuming that the shaft 46 is idle the following status will exist in the apparatus. The blocks 111 and 115 will be in engagement with each other, the pin 130 in engagement with the lower face of the track 107, the slip joint B elevated, the segmental gear 132 positioned with its advance end adjacent the U-shaped member 73 and the arm 133 disposed across said U-shaped member, the pin 143 in engagement with the track 137 at the intersection of the curved faces 138 and 139 and the mold sections 96 held by the lever 141 in the partially closed position shown on the left hand side of Fig. 17. In order to effect one complete operation of blowing with this normal status of the apparatus existing, the motors 57 and 64 are thrown into operation by a switch board D. This operation of said motors will force a blast of air from the fan 63 through the pipes 65, connections 68 and thence through the slip joint B and also effect the continuous rotation of the worm wheel 48 through the various connections heretofore referred to. A blow pipe 80, having a supply of molten glass, is then moved between the arms of the U-shaped members 73 and 79 and this movement of said blow pipe will partially rotate this gear 132 through its engagement with the arm 133. This partial rotation of the gear 132 will effect a partial rotation of the shaft 46 sufficient to disengage the block 115 from the block 111 and thus connect the shaft 46 with the worm wheel 48 in a manner heretofore described so that the rotation of said worm wheel will produce a corresponding rotation of said shaft. During this rotation of the shaft 46 the pin 130 will pass out of engagement with the track 107 and thereby release the lever 126, permitting the slip joint B to descend and operatively connect with the upper end of the blow pipe 80 and thus establish communication between the blow pipe and the air supply. During this rotation of the shaft 46 the segmental gear 132 will engage the gear 36 on the blow pipe and effect the rotation of the latter during the operation of blowing. The rotation of the track 137 is effected by the shaft 46 simultaneously with the rotation of the track 107 and the segmental gear 132 so that the initial movement of the track 137 will further depress the inner end of the lever 141 by the movement of the pin 143 over the curved face 138 and completely close the mold sections 96 so as to properly set the mold C for the operation of blowing. This status of the machine will continue until the shaft 46 has rotated a sufficient distance to simultaneously move the track 107 into engagement with the pin 130, and the segmental gear 132 out of engagement with the gear 136. When this takes place the slip joint B will be elevated by the descent of the inner end of the lever 126 and the blow pipe 80 will cease to rotate. As the track 137 is of greater length than the segmental gear 132 and the track 107 the mold C will be maintained closed for a short period after the blow pipe 80 ceases to rotate and the slip joint has been elevated out of connection with the blow pipe. Continued rotation of the shaft 46 after the disengagement of the track 107 from the pin 130 and the disengagement of the gear 132 from the gear 136 will move the track 137 out of engagement with the pin 143 when the mold sections 96 will move away from each other to complete open position and into the cooling fluid in the cooling tank. Subsequently the pin 143 engages the face 140 of the track 137 and then the face 139 of said track and when said pin has reached the inner end of the face 139 the shaft 46 shall have made one complete revolution which will bring the block 113 into engagement with the block 111 and disconnect the shaft 46 from the worm wheel 48. When this disconnection of the shaft 46 from the worm wheel 48 takes place the track 107 and segmental gear 132 shall have returned to positions previously occupied before the operation of the apparatus was instituted by the application of a blow pipe. The blow pipe 80 is then removed from the apparatus and a fresh blow pipe applied when the cycle of operation previously described will be repeated.

It will be noted that the screws 75 and 76 constitute a bearing for the blow pipe 80 in addition to the bearing 74. As the gear 132 is disposed between the bearing 74 and screws 75 and 76 this construction provides means for maintaining the blow pipe centered with respect to its mold against the tendency of the gear 132 to move the upper end of the blow pipe to the rear. Should it be found that the blow pipe 80 is off center with respect to its mold such condition can be readily and efficiently cured by adjusting the screws 75 and 76 as will be obvious.

What is claimed is:

1. In a glass blowing apparatus the combination of an air supply, a mold, a blow pipe, a blow pipe holder removably supporting said blow pipe, a vertically movable slip joint adapted during its downward movement to pass into operative connection with the upper end of the blow pipe, means for adjusting said blow pipe holder toward and away from the limit of the upward movement of said slip joint whereby the latter may be brought into operative connection with the upper end of the blow pipe at different points in the descent of said slip joint, connections between the slip joint and the air supply and means operated by the application of the blow pipe to said holder for successively moving said slip joint into and out of operative connection with the blow pipe.

2. In a glass blowing apparatus, the combination of a frame, a two part mold having each section thereof carried by a pivoted operating arm, a spring yoke connecting said arms, a vertically-reciprocatory rod connected to said yoke and operating to open and close the sections of the mold through the reciprocation thereof, an arm fixed on said frame having an opening therein through which said rod slides, a lever pivotally mounted on said frame for oscillation in a vertical plane, an arm having one end pivotally connected to the lower end of said rod and its other end secured to said lever whereby the oscillation of the latter will reciprocate the rod to effect the opening and closing of the mold sections, and means for oscillating said lever.

3. In a glass blowing apparatus, the combination of an air supply, molds, blow pipes, a blow pipe holder removably supporting each blow pipe and adjustable toward and away from its mold, rotatable shafts, a segmental gear mounted for rotation with each shaft and adjustable longitudinally of the latter, a gear on each blow pipe meshing with a respective segmental gear when the blow pipe is disposed in its holder whereby the rotation of the shaft carrying said segmental gear will effect the rotation of the blow pipe, and a common means for simultaneously adjusting all of said segmental gears longitudinally of said shafts and said blow pipe holders toward and away from the molds whereby said segmental gears and blow pipes may be maintained in the same relation to each other.

4. In a glass blowing apparatus, the combination of an air supply, a mold, a blow pipe, a blow pipe holder removably supporting said blow pipe, means for connecting the blow pipe with the air supply, a driving shaft and means for rotating same, a driven shaft, a clutch connection between the driving and driven shaft adapted to be thrown in by partial rotation of the driven shaft, a segmental gear mounted on said driven shaft for rotation therewith, a gear on said blow pipe adapted to mesh with said segmental gear when said blow pipe is fully inserted in the holder and an arm carried by and connected to said gear adapted to be engaged by the blow pipe in its application to the holder whereby a partial rotation will be imparted to the driven shaft to throw in the clutch connection, said connection being arranged to be thrown in simultaneously with the full insertion of the blow pipe in the holder.

5. In a glass blowing apparatus, the combination of an air supply, a mold, a blow pipe, a blow pipe holder removably supporting said blow pipe holder, a rotatable shaft, a segmental gear mounted on said shaft for rotation therewith, a gear on said blow pipe meshing with said segmental gear when the blow pipe is disposed within the holder whereby the rotation of said shaft will effect the rotation of the blow pipe, a pair of spaced bearings carried by said blow pipe holder disposed above and below said segmental gear respectively and means for adjusting the uppermost of said bearings horizontally.

6. In a glass blowing apparatus, the combination of an air supply, a mold, a blow pipe, a blow pipe holder removably supporting said blow pipe, a rotatable shaft, a segmental gear mounted on said shaft for rotation therewith, a gear on said blow pipe meshing with said segmental gear, when the blow pipe is disposed within the holder whereby the rotation of said shaft will effect the rotation of said blow pipe, a bearing for said blow pipe carried by the holder and disposed beneath the segmental gear, a plurality of thumb screws mounted on the holder for horizontal adjustment and constituting a bearing for the blow pipe, said thumb screws being disposed above the segmental gear.

7. In a glass blowing apparatus, an air supply, a blow pipe, connections between the blow pipe and the air supply, said connections being provided with an opening to the atmosphere for relieving the pressure of the air therein, a valve normally closing said opening, said valve comprising a plate having one end pivotally mounted above the opening and its lower end terminating in a reduced extension in vertical alinement with the upper pivoted end of the plate, a screw threaded in said reduced extension and disposed in the vertical axis of the plate and a weighted head on said screw adapted to be moved toward and away from the valve as said screw is rotated whereby the resistance offered to the pressure of the air within the connections by the valve may be increased and diminished.

In testimony whereof, I affix my signature, in presence of two witnesses.

ALBERT C. WILCOX.

Witnesses:
CHAS. WILCOX,
E. C. YAHRLING.